United States Patent [19]

Teti

[11] 4,060,144
[45] Nov. 29, 1977

[54] COMBINED ACCELERATOR AND BRAKE ASSEMBLY

[75] Inventor: John J. Teti, Saltville, Va.

[73] Assignee: Pyott-Boone Machinery Corporation, Saltville, Va.

[21] Appl. No.: 648,054

[22] Filed: Jan. 12, 1976

[51] Int. Cl.² .............................................. B60K 26/02
[52] U.S. Cl. ................................... 180/77 R; 74/513; 74/560
[58] Field of Search ....................... 180/77 MC, 77 R; 74/512, 513, 560

[56] References Cited

U.S. PATENT DOCUMENTS

| 600,509 | 3/1898 | Brougham | 74/512 X |
|---|---|---|---|
| 1,074,186 | 9/1913 | Maxfield | 74/512 |
| 1,385,331 | 7/1921 | Barbarou | 74/512 |
| 1,469,258 | 10/1923 | Geistert | 74/512 |
| 1,478,407 | 12/1923 | Sturt | 74/512 |
| 2,097,391 | 10/1937 | Fageol | 180/77 R |
| 2,252,871 | 8/1941 | Sohl | 180/77 R |
| 2,336,386 | 12/1943 | Beck | 180/77 R |
| 3,063,528 | 11/1962 | Wood | 180/103 R X |
| 3,331,464 | 7/1967 | Van Doorne | 180/77 R |
| 3,563,111 | 2/1971 | Zeigler | 74/512 |

Primary Examiner—Joseph F. Peters, Jr.
Assistant Examiner—John P. Silverstrim
Attorney, Agent, or Firm—Robert D. Yeager; Howard G. Massung

[57] ABSTRACT

A combined accelerator and brake assembly is adapted to be used on self-propelled rubber tired vehicles which have accelerator and brake actuating means either side-by-side or on opposite sides of the vehicle operator. The self-propelled rubber tired vehicle or tractor is often used in underground mining operations. The combined accelerator and brake assembly means is comprised of a mounting plate which holds the assembly and can be bolted onto the tractor or vehicle chassis. Two bearing supports with accompanying bearings are attached to the mounting plate through which a shaft is supported. A coaxial member extends the length of the shaft between the bearing supports and has bearings at the opposing ends thereof for engaging the shaft. Depending on the location of the actuating means for the brake and accelerator relative to the operator's position, an accelerator pedal right-brake pedal left arrangement can be provided by mounting the brake activator on the end of the coaxial member proximate to the brake actuating means and the accelerator activator on the end of the shaft proximate to the accelerator actuating means. The brake pedal is mounted on the coaxial sleeve member and the accelerator pedal is mounted to the right of the brake pedal on the shaft. Thus, whether the existing brake actuating and accelerating actuating means are on the same or opposing sides of the operator's position or if said actuating means are brake on right and accelerator on left, the brake pedal left accelerator right pedal arrangement can be effected by positioning the proper activating members along the shaft and coaxial concentric member.

6 Claims, 8 Drawing Figures

COMBINED ACCELERATOR AND BRAKE ASSEMBLY

BACKGROUND OF THE INVENTION

1. Field of the Invention

This invention relates to self-propelled rubber tired vehicles or tractors used in mining and more particularly to accelerator brake assemblies for use in standardizing the accelerator brake pedal arrangements in mine vehicles.

2. Description of the Prior Art

Self-propelled mine vehicles for the transportation of coal, and ores are necessary for the collection and removal of the materials to be mined from shafts within the earth. The mine shafts are necessarily very narrow and low depending on the width and height of the vein which is mined. Necessarily, the mine vehicles whether used for collection or removal or both must be as compact as possible while still maintaining a large capacity for the mined material.

Further, when such materials are collected by the self-propelled rubber tired mine vehicles, a maximum versatility and maneuverability of the vehicle is necessary which causes the operator to use the brake and accelerator pedals of the mine vehicle in rapid succession. Because of this rapid alteration of brake and accelerator use, mining companies desire uniformity in self-propelled mine vehicles such as having the brake and accelerator pedals in the same relative position to each other to prevent accidental misuse of the wrong pedal which may cause an accident. However, because of the restricted space and variation in the self-propelled mine vehicles manufactured by a plurality of manufacturers, the brake and accelerator pedals may be in different relative positions depending on the position of the brake and accelerator actuating means in relation to the mine vehicle operator.

In accordance with the present invention, a combination brake-accelerator assembly is provided which can adapt the positioning of the accelerator and brake pedals to be the same, no matter where the location of the accelerator and brake actuating means are located in relation to the mine vehicle operator.

SUMMARY OF THE INVENTION

A combination accelerator-brake assembly for adapting to the accelerator right-brake left positioning of the pedals of a self-propelled rubber tired mine vehicle is provided, which can be used regardless of the relative positions of the existing actuating means for accelerating and braking of the mine vehicle.

The assembly comprises a mounting plate which is attached to the mine vehicle chassis with two bearing supports including associated bearings, securely fastened to the plate. A shaft is supported by the two bearing supports and a sleeve member is disposed around the shaft between the two bearing supports. The sleeve has bearings at the opposing ends thereof for engaging and rotating about the shaft. Depending on the location of the actuating means for the brake and accelerator relative to the operator's position, an accelerator right-brake left arrangement can be provided by mounting the brake activator on the end of the sleeve member proximate to the brake activating means and the accelerator activator on the end of the shaft proximate to the accelerator actuating means. The brake pedal is mounted on the sleeve member and the accelerator pedal is mounted to the right of the brake pedal on the shaft. Thus, whether the brake actuating and acceleration actuating means are on the same or opposite sides of the operator's position, the brake pedal left-accelerator pedal right arrangement can be effected by positioning the proper activation members along the shaft and sleeve members. That is, by appropriate assembly of the disclosed adapter, a self-propelled rubber tired mine vehicle having: (1) the brake and accelerator activator on the right; (2) the brake and accelerator activator on the left; (3) the brake activator right and the accelerator activator left; or (4) the brake activator left and the accelerator activator right, can be adapted to a standardized brake pedal left and accelerator pedal right arrangement.

In another embodiment, the sleeve is rotatably supported by two bearing supports from the mounting plate. The shaft, which passes through the sleeve, is rotatably supported on bearings connected to the sleeve. Alternately both the shaft and sleeve could be mounted on supports extending from the mounting plate. By mounting the accelerator pedal to the sleeve or shaft member and the brake pedal to the other member with proper positioning of the accelerator and brake activator, various accelerator-brake arrangements can be adapted to a standard accelerator right-brake left configuration. In all embodiments of the invention, the shaft and sleeve are supported for rotary movement around their longitudinal axes while movement along their longitudinal axes is restricted. The position of either the shaft or sleeve, with the associated pedal attached, does not effect rotatability of the other member. The pedals and activators can attach or connect to the sleeve and shaft at various locations to accommodate a variety of different type rubber tired self-propelled mine vehicles.

In actual practice, a mine vehicle owner can receive the disassembled combination brake accelerator assembly, and assemble it so that the brake pedal will be on the left and the accelerator will be on the right regardless of the location of the acceleration and brake activation means on the individual self-propelled rubber tired mine vehicle.

BRIEF DESCRIPTION OF THE DRAWINGS

The invention can be further understood with the aid of the following drawings in which.

DESCRIPTION OF THE PREFERRED EMBODIMENT

Figure 1:
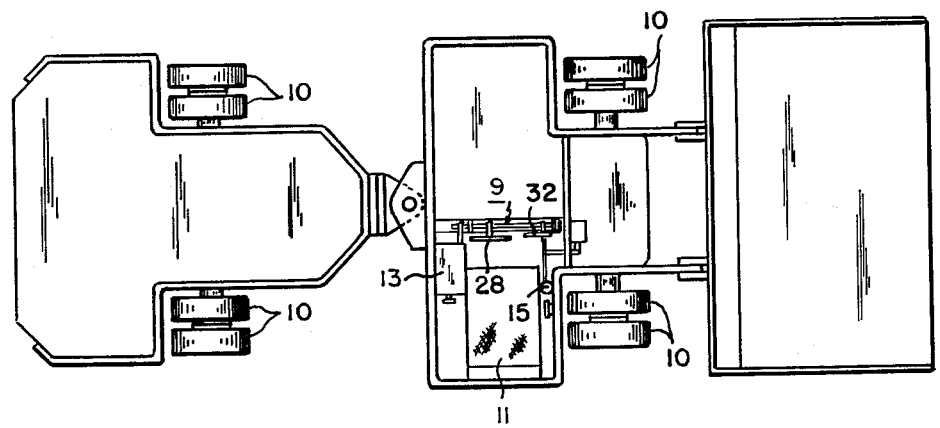
FIG. 1 is a top view of a self-propelled rubber tired mine vehicle with the brake actuating means on the right and the accelerator actuating means on the left relative to the operator.
Figure 2:
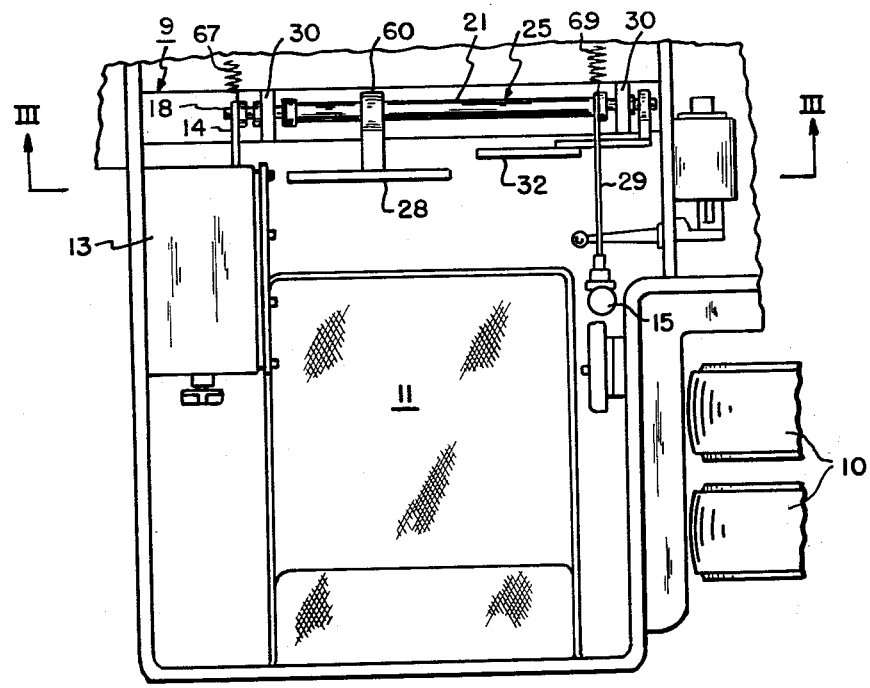
FIG. 2 is an enlarged view of the operator's compartment of the mine vehicle shown in FIG. 1 utilizing the teaching of the present invention with the brake actuating means on the right and the accelerator actuating means on the left.
Figure 3:
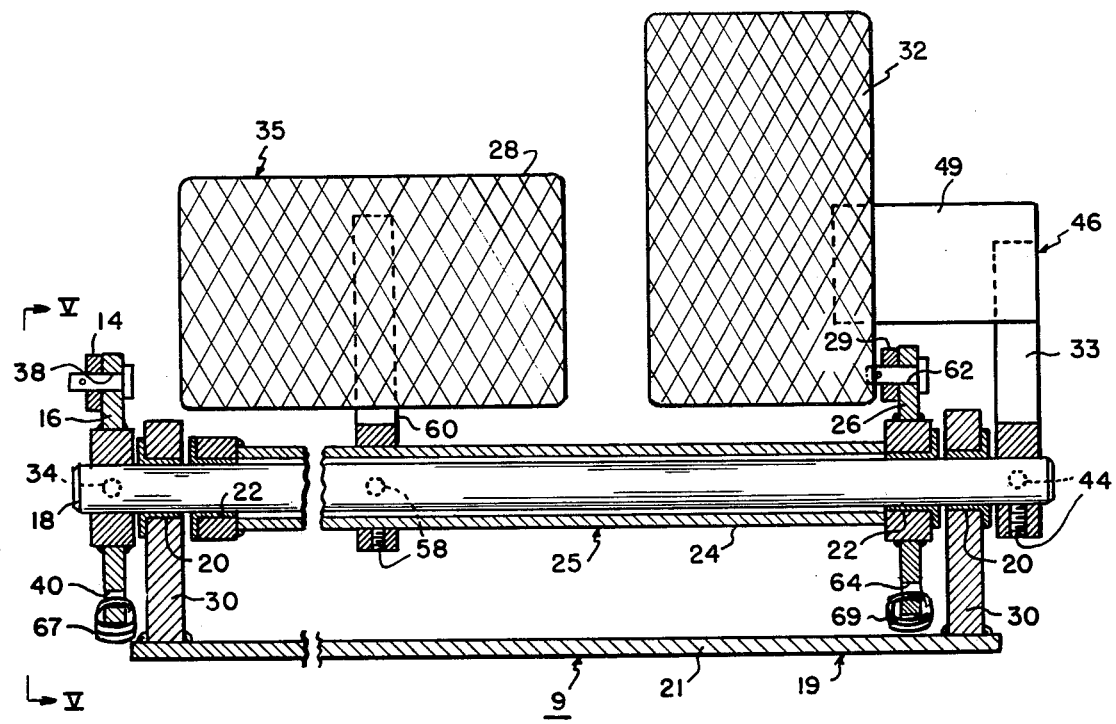
FIG. 3 is a view, partially in section, of a portion of the mine vehicle shown in FIG. 2 along the line III—III.

Referring now to the drawings and FIGS. 1, 2 and 3 in particular, there is shown a self-propelled rubber tired vehicle utilizing the teaching of the present invention, having the brake activation means on the right and the accelerator activating means on the left adapted for an accelerator pedal right brake pedal left arrangement. The disclosed brake and accelerator adapter 9 converts a self-propelled rubber tired vehicle to one having a standard brake and accelerator arrangement. The mine vehicle operator sits in seat 11 with acceleration control box 13 on his left and brake master cylinder 15 on his right. The control box 13 contains apparatus which controls the speed of the motor which drives wheels 10. The control box 13 is responsive to the position of the accelerator link 14 which is connected to an accelerator lever 16 mounted on a shaft 18. Shaft 18 is supported by bearings 20 which are connected to a mounting plate 21, not shown in FIG. 1. A concentric sleeve member 24 coaxial with shaft 18 is freely rotatable therearound. The sleeve member 24 is supported on bearings 22 from shaft 18 and is rotatable around shaft 18. Brake activator lever 26 is attached on sleeve member 24 and is responsive to brake pedal 28. Brake pedal 28 is mounted to sleeve 24 through connecting arm 60. Thus when brake pedal 28, mounted to concentric sleeve member 24, is depressed, concentric sleeve member 24 is rotated, rotating brake activator 26 moving the brake connecting link 29 exerting force to activate master cylinder 16. Activating master cylinder 16 hydraulically applies braking force to wheels 10. When the operator desires to accelerate the mine vehicle, he depresses accelerator pedal 32 which through connecting arm 46 rotates shaft 18 rotating accelerator lever 16 which is connected for unitary movement. Moving lever 16 causes accelerator link 14 to move, adjusting the speed of the vehicle through control box 13. Thus, in FIGS. 1, 2 and 3, the combination brake accelerator assembly of the invention adapts the accelerator left-brake right arrangement of a mine vehicle or tractor to provide an accelerator pedal right-brake pedal left arrangement.

As indicated above, FIG. 3 shows the arrangement of the combined accelerator and brake assembly of the invention adapting an accelerator actuator left-brake actuator right arrangement, as shown in FIGS. 1 and 2, to an accelerator pedal right-brake pedal left arrangement. In actual practice, an existing accelerator brake assembly is removed and the accelerator brake assembly of the invention is substituted therefore by securing mounting plate 21 with the assembly, as shown in FIG. 3 for example, to the chassis of the mine vehicle.

A pair of bearing supports 30 are securely mounted to mounting plate 21. A bearing 20 is constructed in each bearing support 30 to rotatably support shaft 18. Shaft 18 is freely rotatable within the self-lubicating bearings 20 mounted in bearing supports 30. Accelerator lever 16 is removably mounted to shaft 18 by set screws 34. Accelerator lever 16 is secured to shaft 18 intermediate the ends thereof. Two apertures 38 and 40 are provided near opposite ends of accelerator lever 16. One aperture 38 is used for connection to the accelerator link 14 and the other 40 for connection to a return spring 67. Accelerator pedal 32 is removably mounted to shaft 18 through accelerator support arm 46 which is connected to shaft 18 by set screws 44. When accelerator pedal 32 is depressed, shaft 18 is rotated, rotating accelerator lever 16 moving link 14 connected to control box 13. When the operator releases accelerator pedal 32, return spring 67 moves pedal 32 back to its unactivated up position.

Figure 7:
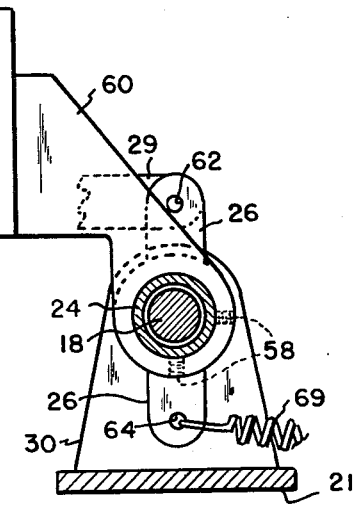
FIG. 7 is a view of the assembly shown in FIG. 4 along the line VII—VII showing the brake pedal and brake activator mounted on the sleeve.

The sleeve 24 is coaxial and concentric with shaft 18 and is rotatable thereabout on self-lubricating bearings 22. Brake pedal 28 is securely mounted to arm 60 which is removably mounted to sleeve 24 by set screws 58, as best shown in FIG. 7. Brake lever 26 is permanently mounted on concentric sleeve 24. Apertures 62 and 64 are provided in brake lever 26. One aperture 64 is connected to a return spring 69 and the other aperture connects to link 29, movement of which can actuate master cylinder 15. Thus, when brake pedal 28 is depressed, concentric sleeve 24 is rotated, rotating brake lever 26 which through line 29 causes the brake master cylinder 15 to respond. When the operator releases brake pedal 28, the return spring 69 connected to brake lever 26 moves brake pedal 28 back to its normal up position.

Figure 4:
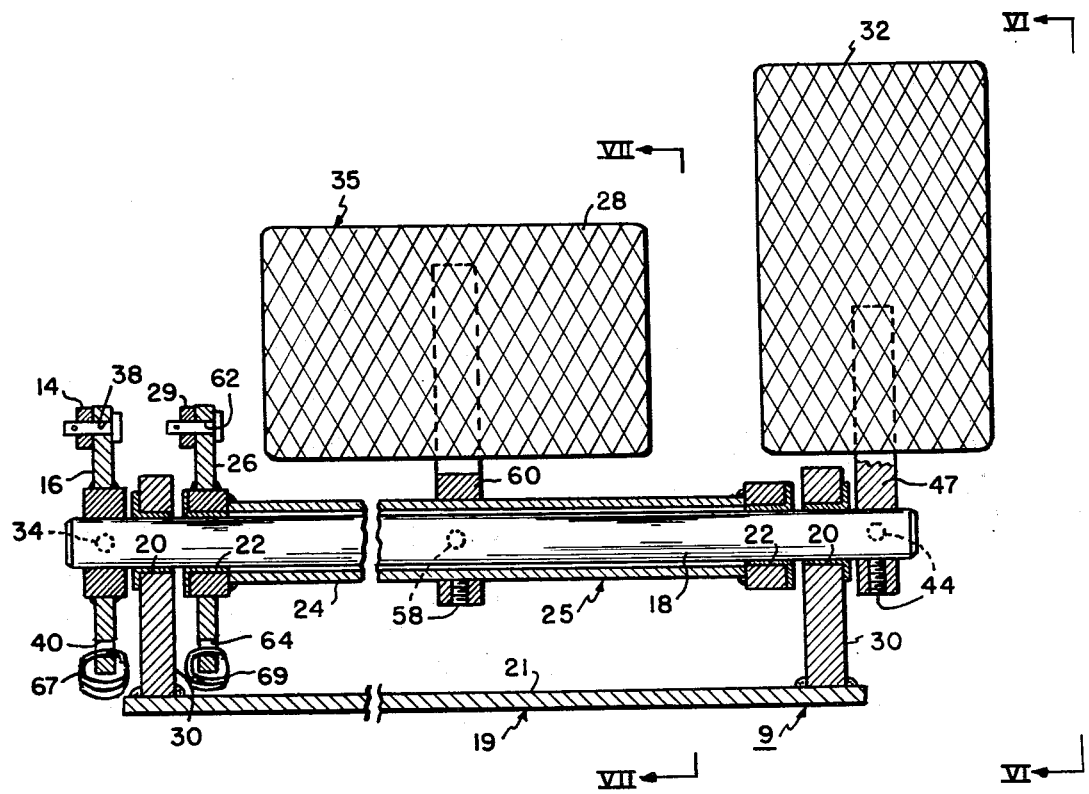
FIG. 4 is a combined brake accelerator assembly of the invention assembled for a mine vehicle wherein the brake and accelerator actuator are both on the left.
Figure 5:
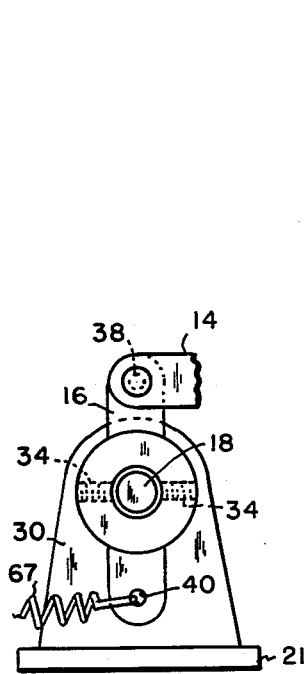
FIG. 5 is a view of the assembly shown in FIG. 3 along the line V—V, showing the accelerator activating lever and spring return lug attached to the shaft.
Figure 6:
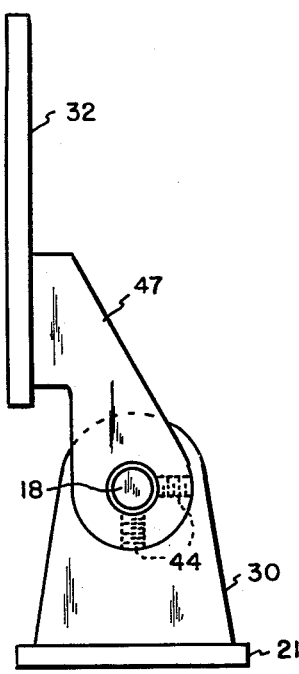
FIG. 6 is a view of the assembly shown in FIG. 4 along the line VI—VI, showing the accelerator pedal mounted on the shaft.

Turning now to FIG. 4, most of the elements therein are the same as FIG. 3 except the arrangement thereof is adapted for a rubber tired self-propelled mine vehicle having a brake actuator and accelerator actuator both on the left. This arrangement adapts the mine vehicle to a standard accelerator pedal right pedal left configuration. The accelerator arm 47 is constructed slightly different since the accelerator pedal is not offset from the point of connection to shaft 18. This modification can be made when shipped or in the field. Accelerator arm 47, shown in FIG. 4, can be the same as accelerator arm 33, shown in FIG. 3, and plate 49 can be supplied for offsetting the accelerator pedal 32 when necessary.

Thus, it can be seen that, by assembling the parts of the disclosed brake and accelerator adapter 9 in an appropriate configuration, various brake and accelerator operator locations can be adapted to a desired standard accelerator right-brake left configuration. The shaft 18 and sleeve 24 are supported for relative rotary movement. Accelerator pedal is connected to shaft 18 which has accelerator lever 16 assembled thereto for unitary movement of shaft 18, pedal 32 and lever 16. A return spring 67 connected to lever 16 moves accelerator pedal 32 to the normal position when released by the operator. Sleeve 24, roatable around shaft 18, has brake pedal 28 and brake lever 26 connected thereto for unitary movement. When the operator releases brake pedal 28, it is returned to its normal position by spring 69 connected to lever 26.

In actual practice, the component parts of the combination accelerator brake assembly are shipped to a mine vehicle owner and the mine car owner assembles the parts in accordance with the particular accelerator actuator brake actuator arrangement on his particular vehicle. The disassembled accelerator-brake assembly is suppled with the following parts:

| Item | Part No. |
| --- | --- |
| Mounting plate 21 with bearings 20 and bearing supports 30 therein | 19 |
| Shaft 18 | 18 |
| Concentric coaxial sleeve 24 with | 25 |

| Item | Part No. |
|---|---|
| bearings 22 thereon and brake lever 26 affixed thereto | |
| Accelerator lever 16 with set screws 34 therein | 16 |
| Accelerator pedal 32 including plate 49 and connecting arm 33 with set screws 44 | 46 |
| Brake pedal 28 including connecting arm 60 with set screws 58 therein | 35 |

Thus simply by assembling the parts supplied, the self-propelled mine vehicle owner can adapt his particular actuator arrangement to the accelerator pedal right-brake left standard.

The following examples demonstrate the various assembly procedures for various accelerator actuator-brake actuator arrangements.

EXAMPLE I

Brake Actuator Right-Accelerator

Actuator Left

In assembling from right to left, shaft 18 is placed through the bearing 20 on the right bearing support 30 attached to mounting plate 21. Sleeve assembly 25 is disposed between bearing 20 with the brake lever 26 positioned to the right. Shaft 18 is then passed through sleeve 24, activator end first, and subsequently through the bearing 20 on the left bearing support 30 attached to mounting plate 21. Accelerator lever 16 is attached to shaft 18 on the left side of the bearing 20 in support 30. Accelerator pedal assembly 46 is then attached to shaft 18 by set screws 44 and brake pedal assembly 35 is mounted to the sleeve 24. The assembled accelerator-brake assembly can replace the existing assembly on the mine vehicle simply by removing the existing assembly and bolting the new assembly to the mine vehicle chassis. The brake link 29 is then connected to brake lever 26 and the accelerator link 14 is connected to accelerator lever 16. Appropriate return springs 67 and 69 are also installed at this time.

EXAMPLE II

Brake Actuator Left-Accelerator

Actuator Left

In assembling from right to left, shaft 18 is placed through the bearing 20 on the right bearing support 30 attached to mounting plate 19. Sleeve 24 is disposed between bearing 20 with the brake lever 26 to the left. Shaft 18 is then passed through sleeve 26 and subsequently through the bearing 20 on the left bearing support 30 attached to mount 21. The assembly is completed as described in Example I.

EXAMPLE III

Brake Actuator Left-Accelerator

Actuator Right

In assembling from right to left, shaft 18 is placed through the bearing 20 on the right bearing support 30 attached to mounting plate 21. Sleeve 24 is disposed between bearings 20 with the brake operating lever 26 positioned to the left. Shaft 18 is positioned through and supporting sleeve 24. Shaft 18 is supported by bearings 20. A collar or pin is connected to the exposed left end of shaft 18 to prevent movement of shaft 18 along its longitudinal axis to the right. The accelerator lever 16 and the accelerator pedal assembly 46 are connected to the exposed right end of shaft 18. Brake pedal assembly 35 is attached to sleeve 24 with set screws 58. The assembly is then attached to the mine vehicle. Links 14 and 29 are installed and appropriate return springs 67 and 69 are connected to levers 16 and 26. This embodiment of the invention has utility in standardizing the assembly even though the pedal arrangment in the mine vehicle was brake left-accelerator right as produced.

EXAMPLE IV

Brake Actuator Right-Accelerator

Actuator Right

In assembling from right to left, the shaft 18 is placed through the bearings on the bearing supports 30 attached to mounting plate 19 and through sleeve 24. Sleeve 24 is disposed with the brake lever 26 positioned to the right. Shaft 18 is supported by bearing 20 and supports sleeve 24 through bearing 22. A collar or pin is attached to the exposed left end of shaft 18 to prevent movement of shaft 18 to the right. The accelerator lever 16 and the accelerator pedal assembly 33 are connected to the exposed right end of shaft 18. Brake pedal assembly 35 is attached to sleeve 24 with set screws 58. The assembly 10 is then attached to the mine vehicle. Links 14 and 29 are installed and appropriate return springs 67 and 69 are connected to levers 16 and 26.

Although a single set of parts may be used in the accelerator brake assembly of the invention, various parts may be included in the retrofit package. For example, as is shown in FIG. 3, a plate member 49 may be provided for proper positioning of accelerator pedal 32 in the desired standard location. Further modification may be provided without departing from the invention such as having the brake pedal permanently mounted on the sleeve but yet positioned so that the accelerator pedal right-brake left arrangement is maintained regardless of the position of the respective actuators.

A still further modification of the invention may be made by extending the length of the sleeve and adjusting the diameter of the mounting bearings so that the sleeve rotates within the bearing.

Figure 8:
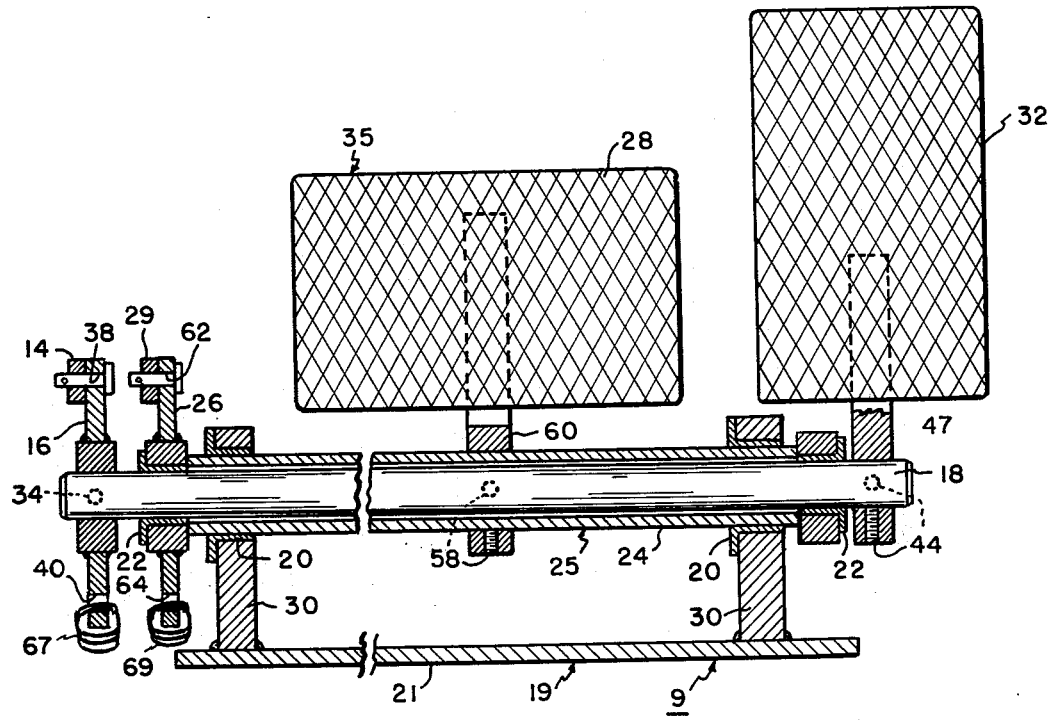
FIG. 8 shows another embodiment of the invention wherein the sleeve is rotatably supported from the base plate.

Another embodiment of the invention is shown in FIG. 8 wherein sleeve 24 is supported by bearings 20 disposed in bearing supports 30. Shaft 18 where disposed in sleeve 24 is then supported by bearings 22. Brake pedal 28, accelerator pedal 32, accelerator lever 16, and brake lever 26 can then be assembled as described above to accommodate a variety of mine vehicles. Other modifications are also contemplated such as forming the sleeve or shaft of other shapes to aid in positioning or assembly. Also if desired, the shaft may be positioned so as not to be coaxial with the sleeve.

Thus, in accordance with the invention, a retrofit assembly is provided to adapt mine vehicles having accelerator actuators and brake actuators in a variety of positions relative to the position of the mine car operator to an acceleration pedal right-brake pedal left position.

Although the invention has been described in reference to specific components and assembly techniques, it is only to be limited as is set forth in the accompanying claims.

What is claimed is:

1. An accelerator and brake pedal assembly for use on a vehicle having a floor, accelerator actuating means and brake actuating means, said pedal assembly comprising:
- a mounting plate adapted to be mounted on the upper side of said floor;
- a pair of spaced, upwardly extending supports mounted on said plate;
- a bearing mounted in each of said supports, said bearings being aligned to define an axis;
- a shaft extending along said axis, rotatably supported by said bearings;
- an accelerator pedal mounted on said shaft for rotating therewith;
- means mounted on said shaft for rotation therewith, adapted to be connected to said accelerator actuating means for control thereof in response to rotation of said accelerator pedal;
- a tubular sleeve member coaxially, rotatably mounted on said shaft;
- a brake pedal;
- means for slidably mounting said brake pedal along said sleeve member between a plurality of fixed positions in which said pedal is rotatable with said sleeve member; and,
- means mounted on said sleeve member for rotation therewith, adapted to be connected to said brake actuating means for control thereof in response to rotation of said brake pedal.

2. An accelerator and brake pedal assembly as claimed in claim 1 comprising:
- first spring biasing means connected to said shaft for biasing said shaft and said accelerator to a predetermined position; and,
- second spring biasing means connected to said tubular sleeve member for biasing said tubular sleeve member and said brake pedal to a predetermined position.

3. An accelerator and brake pedal assembly as claimed in claim 1 wherein:
- said accelerator pedal is removably mounted to said shaft.

4. An accelerator and brake pedal assembly as claimed in claim 1 wherein:
- said tubular sleeve member is disposed between said pair of spaced upwardly extending supports.

5. An accelerator and brake pedal assembly as claimed in claim 1 comprising:
- a seat for the operator of said vehicle; and,
- said accelerator pedal mounted to the right of said brake pedal with respect to said seat for the operator of said vehicle.

6. An accelerator and brake pedal assembly as claimed in claim 1 wherein:
- said means mounted on said shaft for rotation therewith comprises an upward extending arm and a downward extending arm, a return spring connected to said downward extending arm, and a connecting link connected between said upward extending arm and said accelerator actuating means; and,
- said means mounted on said sleeve for rotation therewith comprises an upward extending arm and a downward extending arm, a return spring connected to said downward extending arm, and a connecting link connected between said upward extending arm and said brake actuating means.

* * * * *

UNITED STATES PATENT AND TRADEMARK OFFICE
CERTIFICATE OF CORRECTION

PATENT NO. : 4,060,144
DATED : November 29, 1977
INVENTOR(S) : John J. Teti

It is certified that error appears in the above-identified patent and that said Letters Patent are hereby corrected as shown below:

Column 4, line 33, after "right" --brake-- should be inserted.

Signed and Sealed this

Fourteenth Day of March 1978

[SEAL]

Attest:

RUTH C. MASON
Attesting Officer

LUTRELLE F. PARKER
Acting Commissioner of Patents and Trademarks